No. 656,505. Patented Aug. 21, 1900.
J. J. BRANNAGAN.
COMBINED MOLD AND PRESS.
(Application filed Oct. 25, 1899.)
(No Model.) 2 Sheets—Sheet 1.
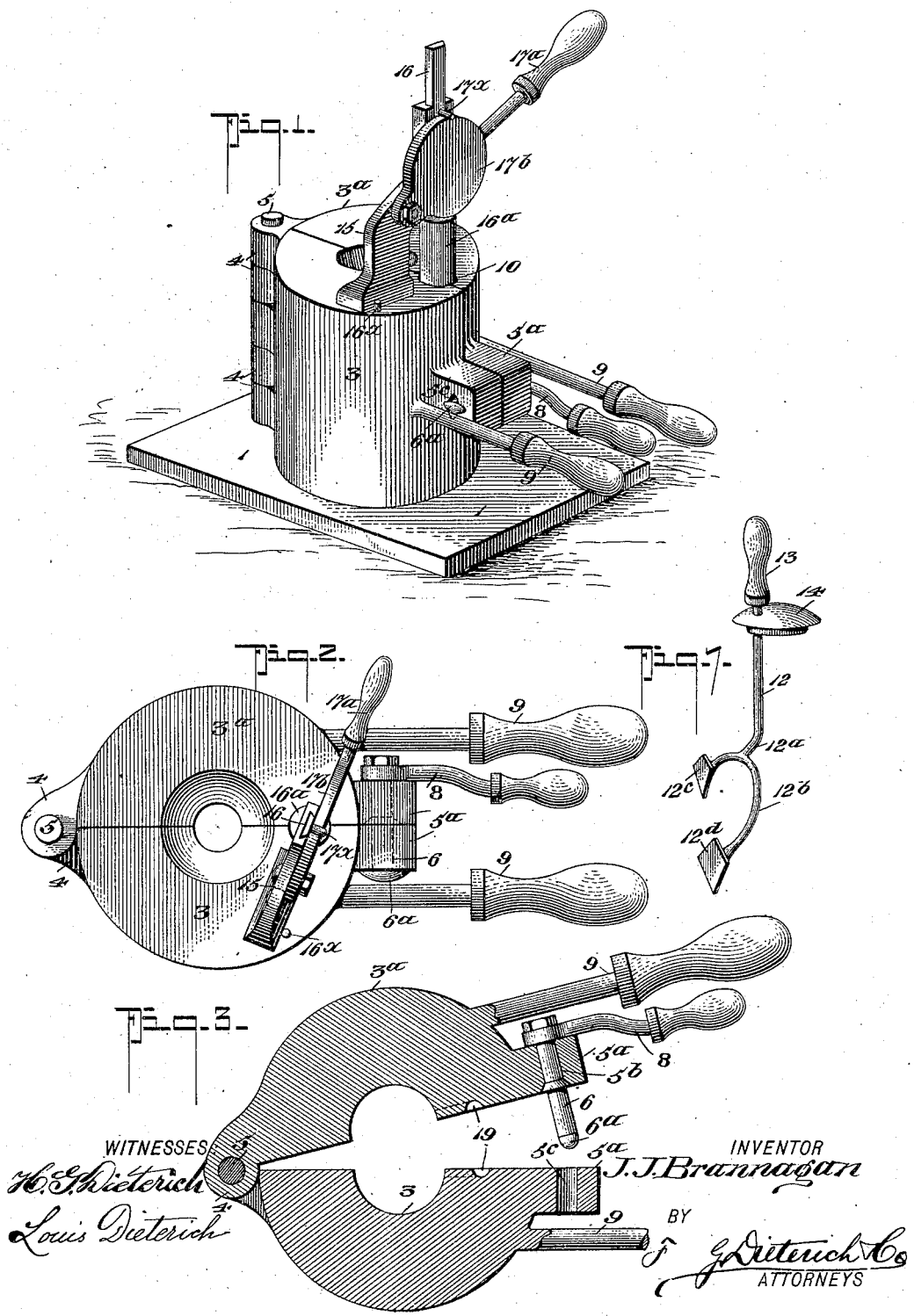
WITNESSES
INVENTOR
J. J. Brannagan
BY
ATTORNEYS

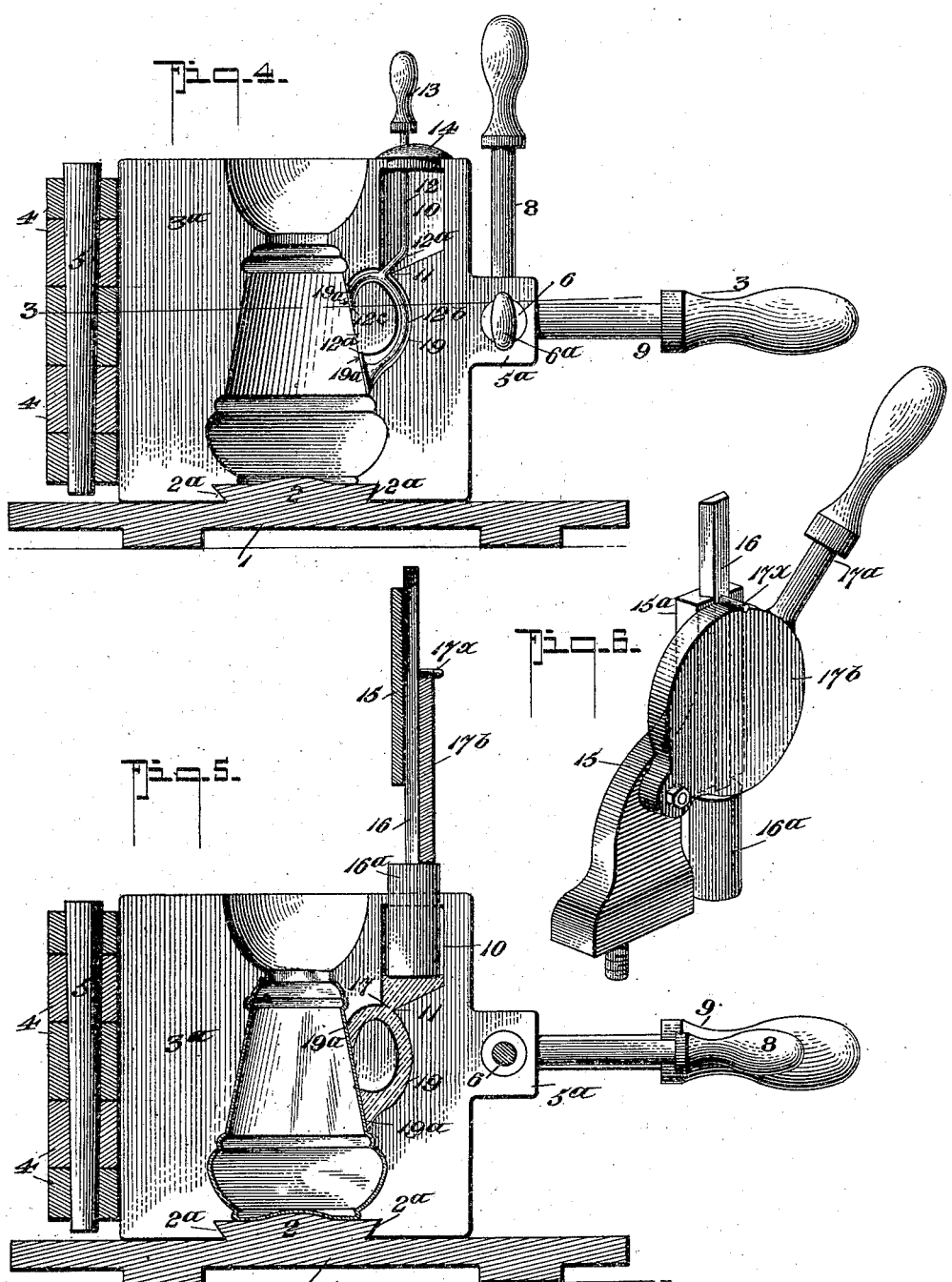

UNITED STATES PATENT OFFICE.

JOHN J. BRANNAGAN, OF STEUBENVILLE, OHIO, ASSIGNOR OF ONE-HALF TO F. W. KLAGES, OF PITTSBURG, PENNSYLVANIA.

COMBINED MOLD AND PRESS.

SPECIFICATION forming part of Letters Patent No. 656,505, dated August 21, 1900.

Application filed October 25, 1899. Serial No. 734,702. (No model.)

*To all whom it may concern:*

Be it known that I, JOHN J. BRANNAGAN, residing at Steubenville, in the county of Jefferson and State of Ohio, have invented a new and Improved Combined Mold and Press, of which the following is a specification.

This invention relates to improvements for manufacturing blown glassware, and it seeks to provide an improved form of divided mold of a very simple and economical construction that can be readily manipulated by unskilled labor and will effectively serve for its intended purposes.

In its subordinate features this invention consists in certain details of construction and peculiar combination of parts, all of which will hereinafter be fully described and claimed, reference being had to the accompanying drawings, in which—

Figure 1 is a perspective view of my improvement, the mold being closed and the presser shown in position for forming the handle portion. Fig. 2 is a top plan view of the mold closed. Fig. 3 is a horizontal section of the mold, taken practically on the line 3 3 of Fig. 4, the two parts of the mold being swung to an open position. Fig. 4 is a vertical section of the mold, showing the glass body blown in. Fig. 5 is a similar view illustrating the manner of forming the handle by pressing. Fig. 6 shows the pressing-plunger and its supporting member detached; and Fig. 7 is a detail view of the skeleton handle, hereinafter referred to.

My invention comprehends a body portion in the nature of a two-part mold hinged together, each part having an operating-handle and the two parts formed with locking devices for holding them together during the operation of forming the article therein. This portion of my appliance may be constructed in any well-known manner. I prefer, however, to construct the same as shown in the accompanying drawings, in which like numerals indicate like parts in all the figures.

1 indicates a bottom plate having a central upwardly-projecting hub 2, the upper face of which has a contour corresponding to the shape it is desired to form the bottom of the pieces of glassware.

The mold-body proper consists of two half-sections 3 3$^a$, each having an internal mold-face corresponding to the contour of the article it is intended to make. The two sections 3 3$^a$ have suitable laterally-projecting ears 4 4, joined by the hinge-pin 5, and at a point diametrically opposite the hinge the mold-sections have each an apertured lug 5$^a$, the aperture 5$^c$ of one lug being in the nature of a key-slot to accommodate the lock-tang 6$^a$ of the key member 6, held to rock in the lug-aperture 5$^b$, and having a suitably-arranged operating-handle 8. Each section 3 3$^a$ has a handle 9 9 for conveniently manipulating the mold, the two handles 9 9 projecting in a like direction.

The construction, so far as described, of my device does not practically differ from the ordinary form of mold for blowing glassware, it being obvious that in operation the handle 8 is manipulated to bring the locking-tang 6$^a$ in position to permit the two mold-sections being swung apart.

In operation the blower places the glass bunch between the mold members, closes and locks them, and while so doing he closes the two mold members to fit upon the upwardly-projecting hub 2 on the bottom plate 1, the mold when it is thus closed being held locked to the bottom plate 1 by reason of the annular rim of the hub 2 being undercut or made dovetailed to engage correspondingly-shaped recesses 2$^a$ in the bottom of the mold members, as best shown in Fig. 4.

By reference to Figs. 2 and 4, it will be noticed that the mold is formed with a hollow cup-like chamber 10, which chamber, it should be stated, is formed half in one mold-section and the other half in the opposite mold-section, and the said cup or chamber 10 communicates, through a narrow throat 11, with a supplemental divided mold-section 19, which has a shape to suit the handle or other projection that it is intended to form a part of the blown body. In the drawings the said projection is shown in the nature of an ear-handle, and the said mold-section 19, it will be further observed, communicates at 19$^a$ and 19$^a$ with the internal face of the mold. During the operation of blowing the body of the ware it is necessary that the openings 19ᵃ 19ᵃ be closed, so as to complete the internal face of the said mold member to make it correspond with its opposing face. For this purpose I have provided what I term a "skeleton" handle, which is separately illustrated in Fig. 7 of the drawings and consists of a tang 12, the lower end of which is bent at an angle, as at 12ᵃ, and is sufficiently narrow to pass through the throat 11, said end 12ᵃ terminating in a curved portion 12ᵇ, which has a shape to readily fit the supplemental mold portion 19, the said section 12 having its ends terminating in flat cover-plates 12ᶜ 12ᵈ. The upper end of the tang 12 has a handle 13, and the said tang passes through a detachable cover member 14, the purpose of which will be readily understood by reference to Fig. 4.

In practice when the mold-sections are closed the skeleton handle is fitted in between the two sections in such manner that its closure members 12ᶜ 12ᵈ will close the openings 19ᵃ 19ᵃ, and thereby make the faces of the two mold-sections correspond, so as to produce an uninterrupted internal mold-face. After the body of the ware has been blown in the usual manner the mold-sections are opened and the skeleton handle is removed. Molten glass is then poured into the chamber 10, and the said glass is then compressed and caused to flow through the throat 11 to fill the supplemental mold portion 19 and engage with the sides of the body with which it anneals. The mold members are then again opened, and the glass, with its projecting handle, is removed from the mold, and the excess or lump glass, such as might remain within the chamber 10, is broken off at a point marked 17, and any abrasion or roughness of such point is then removed by etching or grinding the handle or other projection at the said point 17.

As a convenient means for pressing the handle or other projection against the blown body I employ a casting or bracket 15, which has a threaded shank and which is adapted to engage a threaded socket in one of the mold-sections, as best illustrated in Fig. 1. The bracket 15 has a vertical guide portion 15ᵃ, in which is held to slide vertically a plunger-shank 16, the lower or plunger portion 16ᵃ of which is of a diameter to snugly project into the chamber 10, before referred to.

As a convenient means for operating the plunger I employ a disk 17ᵇ, pivotally connected to the guide 16, said disk having a suitable operating-handle 17ᵃ.

In operation to press the glass within the chamber 10 the operator pulls the handle down, and thereby causes the disk 17ᵇ to engage the plunger and force it down into the chamber 10. To facilitate the lift of the plunger, its shank or stem has a laterally-projecting pin 17ˣ, that projects over the upper rim of disk 17, whereby the lift of the handle 17ᵃ will cause the disk 17 to engage the pin 17ˣ and raise the plunger. 16ˣ indicates a stop-pin for holding the plunger devices in a proper position when swung around in line with chamber 10.

From the foregoing, taken in connection with the accompanying drawings, it is thought the complete operation and advantages of my invention will be readily apparent to those skilled in the art to which it appertains.

The device is of a simple character and can readily be operated by a boy. In the practical employment of my appliance the skeleton handle is placed in position to close off the cavity or openings 19ᵃ 19ᵃ before the blower puts his glass in the mold. After having done so the boy closes the mold with the skeleton 4 in position, after which the blower blows the article until it breaks off at the blowpipe. The mold is then opened sufficient to remove the skeleton 4, after which it is again closed and held locked by properly manipulating the locking-lever. A boy then gathers a quantity of glass—a little more than necessary to form the handle—and drops it into the chamber 10. After having done so he properly manipulates the plunger and presses the glass within the chamber through the orifice 11 into the supplemental mold portion 19, it being understood that the glass passing out through the openings 19ᵃ 19ᵃ adheres to the side faces of the blown article. After having thus manipulated the appliance the boy opens the mold, takes the article out, and breaks off the surplus glass that remains within the chamber 10 at the contracted point 17, as before stated. This leaves the article ready for annealing, it being understood any small abrasion or hump at the point 17 is first removed before the article is further treated.

Having thus described my invention, what I claim, and desire to secure by Letters Patent, is—

1. In a mold as described, the combination of a mold formed of two sections hinged together, said mold having a supplemental receiving-pocket, communicating with the main pocket or forming-chamber, and a closure member formed separately of the mold proper and having no fixed connection therewith, said closure member having portions to fit over the discharges of the supplemental mold-section and having a handle adapted to project through the supplemental receiving-pocket above the top of the mold when said closure member is placed in an operative position as specified.

2. In a mold as described; the combination of a mold formed of hinged sections adapted to close against each other each section having a semipart of the supplemental receiving-pocket, said receiving-pocket having openings 19 19ᵃ, communicating with the main pocket or forming-chamber, and an independent device for closing off the said supplemental pocket from the main chamber, said independent closure device being adapted to fit within the supplemental pocket and having portions for covering the openings 19ᵃ, said closure device being held to its operative position by closing the two mold-sections against it as specified.

3. The combination with the hinged main mold-sections having the main mold-cavities to receive the blown glassware, said sections having a supplemental mold-cavity communicating with the main mold chamber or cavity; said sections having a molten-glass-receiving chamber; a throat connecting the said chamber with the supplemental mold-cavity; of a closure member comprising a shank terminating in curved ends having a contour to fit the supplemental cavity and having its end provided with closure members adapted to close that part of the supplemental cavity communicating with the main mold-cavity, the stem of said closure member being arranged to project up through the molten-glass-receiving chamber, substantially as shown and for the purposes described.

4. The combination with the hinged mold-sections having a mold or cavity for the reception of the blown material, the two sections having portions forming a supplemental mold, said supplemental mold communicating with the main molding compartment or cavity; a molten-glass-receiving chamber formed in the mold-sections, said molten-glass-receiving compartment having a throat communicating with the main mold-section and a plunger mechanism comprising a standard, a vertically-reciprocating plunger, and a cam-disk for engaging with the stem of the plunger and adapted to reciprocate the same, said cam-disk having an operating-handle, all being arranged substantially as shown and described.

JOHN J. BRANNAGAN.

Witnesses:
W. M. MOONEY,
JOHN H. McKEE.